United States Patent
Nagel

(10) Patent No.: US 7,410,103 B2
(45) Date of Patent: Aug. 12, 2008

(54) SYSTEM, METHOD AND DEVICE TO DETECT PRODUCT TAMPERING

(76) Inventor: Andreas Rolf Nagel, 435 Wickerberry La., Roswell, GA (US) 30075

( * ) Notice: Subject to any disclaimer, the term of this patent is extended or adjusted under 35 U.S.C. 154(b) by 0 days.

(21) Appl. No.: 11/374,547

(22) Filed: Mar. 13, 2006

(65) Prior Publication Data

US 2007/0210173 A1   Sep. 13, 2007

(51) Int. Cl.
*G06K 19/05* (2006.01)

(52) U.S. Cl. ...................... 235/492; 235/440

(58) Field of Classification Search ............... 235/492, 235/440, 431, 435, 442, 488, 385, 375; 340/568.1, 340/545.6, 545.4, 541, 572.1, 575.4, 572.8, 340/572.9, 539.31, 5.92, 545; 343/893, 894
See application file for complete search history.

(56) References Cited

U.S. PATENT DOCUMENTS

| | | | |
|---|---|---|---|
| 5,151,684 | A | 9/1992 | Johnsen |
| 5,876,816 | A | 3/1999 | Freedman |
| 5,949,059 | A | 9/1999 | Rawson |
| 6,439,625 | B1 | 8/2002 | Schainholz et al. |
| 6,714,121 | B1 * | 3/2004 | Moore ............... 340/10.3 |
| 6,794,000 | B2 | 9/2004 | Adams |
| 6,888,509 | B2 | 5/2005 | Atherton |
| 6,891,474 | B1 | 5/2005 | Fletcher |
| 2002/0036237 | A1 | 3/2002 | Atherton |
| 2002/0135481 | A1 | 9/2002 | Conwell |
| 2002/0183883 | A1 | 12/2002 | Carr |
| 2002/0185544 | A1 | 12/2002 | Baillod |
| 2002/0188259 | A1 | 12/2002 | Hickel |
| 2003/0031819 | A1 | 2/2003 | Adams |
| 2003/0075608 | A1 | 4/2003 | Atherton |
| 2004/0066296 | A1 | 4/2004 | Atherton |
| 2005/0051624 | A1 | 3/2005 | Kipp |
| 2005/0190914 | A1 | 9/2005 | Chen |
| 2005/0242957 | A1 * | 11/2005 | Lindsay et al. ........... 340/572.7 |
| 2006/0214789 | A1 * | 9/2006 | Posamentier et al. ..... 340/545.6 |

FOREIGN PATENT DOCUMENTS

WO    WO 01 71848 A1 *  9/2001

OTHER PUBLICATIONS

Stephen Shepard, RFID, 2005, McGraw-Hill Networking.
Robert A Keist, RFID Labeling: Smart Labeling Concepts and Applications for the Consumer Packaged Goods Supply Chain, 2004, Printronix.

* cited by examiner

*Primary Examiner*—Daniel St. Cyr
(74) *Attorney, Agent, or Firm*—Withers & Keys, LLC

(57) ABSTRACT

Embodiments of the present invention disclose an efficient and inexpensive method for detecting tampered products utilizing current off the shelf components. Features of some embodiments provide for a RFID labeling system that uses multiple RFID components attached to a single product unit being embedded in the product's label and one or more tamper labels. Such RFID labels usually comprise an adhesive label containing an RFID component, a destructible conducting path that acts as an antenna and a unique encryption. The RFID labels transmit the encryption when irradiated by an RF scanner. A complete inventory of multiple associated encryptions reported during an RFID scan of a product package provide positive indication that product has not been tampered with. A missing encryption indicates a faulty product seal or an event of tampering.

17 Claims, 11 Drawing Sheets

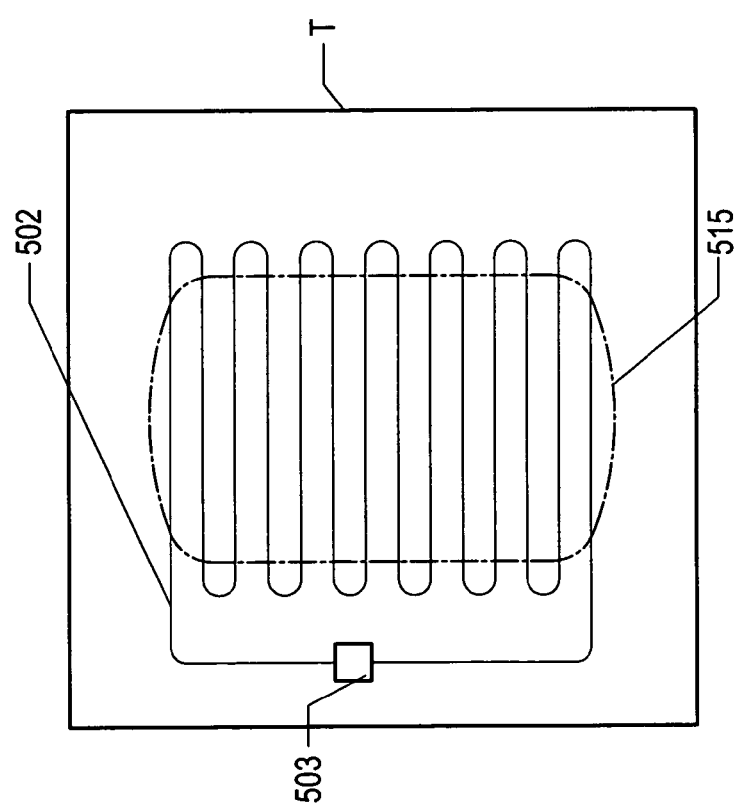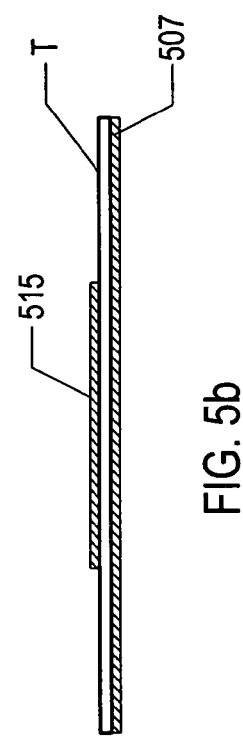

SYSTEM, METHOD AND DEVICE TO DETECT PRODUCT TAMPERING

TECHNICAL FIELD

The present invention relates to a system method and device to detect product tampering utilizing radio frequency identification (RFID) labels.

BACKGROUND

The concept of inventory control and tamper proofing products utilizing radio frequency identification (RFID) is not new. The technology is used widely for consumer and pharmaceutical product inventory control and other purposes.

However, a significant problem continues to exist in today's market which concerns the product liability risk surrounding the unknowing sale of a product with a broken tamper seal to a customer. Either the customer discovers the broken seal after purchase in which case he returns the product which increases product returns and shrinkage. Or worse, he commences a product liability lawsuit. Despite the fact that the customer may not even use the product, a sale with the broken seal opens the door for legal claims based on adulterated product. All reasonable attempts should be made to monitor product packages on the shelf to eliminate tampering after shelving or the acceptance inventory with broken seals in the first instance.

The use of current RFID technology allows for the identification of products while the RFID transponder attached to the product is operating but once the transponder is disabled, the item becomes invisible to the scanner. Inventory control may detect the absence of an item because the RFID transponder no longer registers on the RFID scanner. Such a condition may falsely indicate shop lifting or that the store staff moved the product out of scanning range. The liability remains in that the tampered product may remain on the shelf and available for purchase.

The manual process required by store personnel to inspect and detect broken product seals is time intensive and inefficient. Such inspection would have to be done at least daily by minimum wage employees. More seriously, individuals seeking to intentionally adulterate a product would attempt to cover the evidence of their acts. Such concealment would surely pass unnoticed by store employees. Therefore a need exists for a system to detect tampered products quickly, inexpensively and reliably.

Another important field for the application of the current invention is in the medical field. Health care facilities utilize a plethora of medications that are administered to dozens of patients daily. Theft and tampering with medications is a persistent problem. Also, nursing staff currently deliver medications and either are required to stand by while the patient takes the medication or periodically must check to see if the medication has been taken. A need would arise to track medications and their usage after they are dispensed from the facility pharmacy.

SUMMARY

Embodiments of the present invention address the above issues and others by providing an efficient and inexpensive method for detecting tampered products utilizing current off the shelf components. For example, features of some embodiments provide for a RFID labeling system that uses multiple electronic components such as RFID components. Such RFID labels are well known in the art and usually comprise an adhesive label containing an RFID component and a destructible conducting path or electronic circuit that acts as an antenna. The RFID component and antenna have the ability to transmit information stored on the RFID component to a scanning device when prompted by radio frequency energy transmissions from the scanning device. The stored information may also be simultaneously received by a plurality of scanning devices distributed throughout a facility allowing for locating the product by triangulation.

Preferably, the RFID label is permanently attached to a product package or to the product itself by a strong adhesive such that any attempt to disturb the label destroys the RFID component or antenna and degrades the ability of the RFID component to transmit its information. A non-limiting example of such a label is fully described in U.S. Pat. No. 6,888,509 B2 by Atherton and is hereby incorporated by reference in its entirety although other versions and improvements are envisioned thereto and would not detract from the spirit and purpose of the present invention.

Some RFID labels are attached to products by looping the label device through a product appendage and then adhering to itself. Such a RFID label method is disclosed by Atherton in US patent application 2004/0066296 A1 and is incorporated herein by reference in its entirety as an additional non-limiting example of a use for a tamper label or a product label. It would be evident to one skilled in the art that there may be variations and improvements in RFID and RFID label technology that would be useful for use in the present invention. Such incorporation is envisioned and would not lie outside the scope and spirit of the present invention.

In one exemplary embodiment of the present invention that allows for product tamper detection, multiple RFID components may be embedded in multiple labels. One label may be the "product" information label. Other "tamper" labels may be utilized to seal the accesses in the product package. Each RFID component embedded in each of the labels may have a unique encryption recorded thereon that may be associated with encryptions on the other RFID components affixed to the product package by their tamper labels. Failure of a scanner to detect all the associated encryptions in all the RFID labels on a given package may result in a tamper warning generated by software executing in the scanning device or an associated computer processor.

Another exemplary embodiment of the present invention may be viewed as a tamper prevention system that includes two electronic components and their associated destructible conducting paths that are permanently embedded in two separate labels, a "product" label and a "tamper" label. Each electronic component may be an RFID component and may contain an electronic encryption that is associated with the encryption on the other electronic component wherein both encryptions may be read by a scanner. The product label may be attached to a surface of a product or product container such that it would unlikely to be damaged during handling. A tamper label may be attached across each access to the product or may be embedded in the product packaging in such a fashion as to seal each access so that any attempt to tamper with the product would necessarily require the electronic component or antenna embedded in the tamper label or package to be degraded or destroyed.

When an untampered product is scanned all electronic components transmit their encryptions. The receipt of all of the encryptions by the scanner indicates that the product exists on the shelf and that the tamper labels have not been degraded. When a product with a disabled tamper label is scanned, the receipt of less than all of the encryptions embedded in the product labels may indicate to the scanner that the product exists on the shelf but that a tamper label or product label has been degraded and the product should be removed from offer. When a product with a disabled product label is scanned, the receipt of only the encryption embedded in the tamper label may indicate to the scanner that the product exists on the shelf but that the product label has been degraded and the product should be investigated if not removed from offer.

An embodiment of the present invention may be viewed as a method to detect product tampering that includes irremovably affixing a product RFID label ("PRFIDL") to a surface of a product package, wherein the PRFIDL integrally includes a first electronically readable encryption recorded on a first RFID component connected to a first destructible conducting path. Irremovably affixing one or more tamper RFID labels ("TRFIDL") to one or more accesses in the product package, wherein penetrating any of the one or more accesses shall disrupt an additional destructible conducting path electrically connected to an additional RFID component each of which are integrally attached to the one or more TRFIDLs, wherein further the additional RFID component contains an additional electronically readable encryption that is associated with the first electronically readable encryption. Reading from the PRFIDL and the one or more TRFIDLs the first electronically readable encryption and the additional electronically readable encryption(s). Storing the first electronically readable encryption into a first database and the additional electronically readable encryption(s) into a second database. Comparing the first database with the second database, wherein the existence of the first electronically readable encryption in the first database without finding the associated additional electronically readable encryption in the second database generates an error. And storing the error in a data schema and generating an error report.

An exemplary embodiment of the present invention may be viewed as a device to detect product tampering that includes a PRFIDL portion and one or more tamper strip portions. At least one RFID component is fixedly attached to each of the PRFIDL portion and at least one of the tamper strip portions. The PRFIDL portion and the one or more tamper strip portions may each be a separate sheet of material or different portions of the same sheet of material. At least one destructible conducting path is electrically attached to each of the RFID components and fixedly attached to the portion of its respective RFID component, wherein the at least one destructible conducting path is routed through the tamper strip portion and another destructible conducting path is routed through the PRFIDL. A means for permanently attaching the at least one sheet to at least one surface, wherein any attempt to manipulate the at least the one surface shall disrupt the at least one destructible electrically conducting path.

DESCRIPTION OF THE DRAWINGS

FIG. 5a is a plan view of another embodiment of a tamper RFID label as may be applied to a seal on a box flap.

FIG. 5b is an exemplary cross sectional view of an embodiment of a tamper RFID label as may be applied to box flaps.

DETAILED DESCRIPTION

Embodiments of the present invention include tampering prevention labels and associated methods of constructing, attaching and applying the tamper prevention labels to a variety of product packages. Certain embodiments of the present invention include multiple RFID components embedded in multiple labels. Certain embodiments of the present invention include multiple RFID components embedded in different portions of a single label namely a product portion and one or more tamper portions. Certain embodiments of the present invention include RFID components embedded in TRFIDL's that include tamper strips. Certain embodiments of the present invention include RFID components embedded in a variety of specialty TRFIDL's such as shrinkwrap which is a non-limiting example of a substrate.

Figure 1:
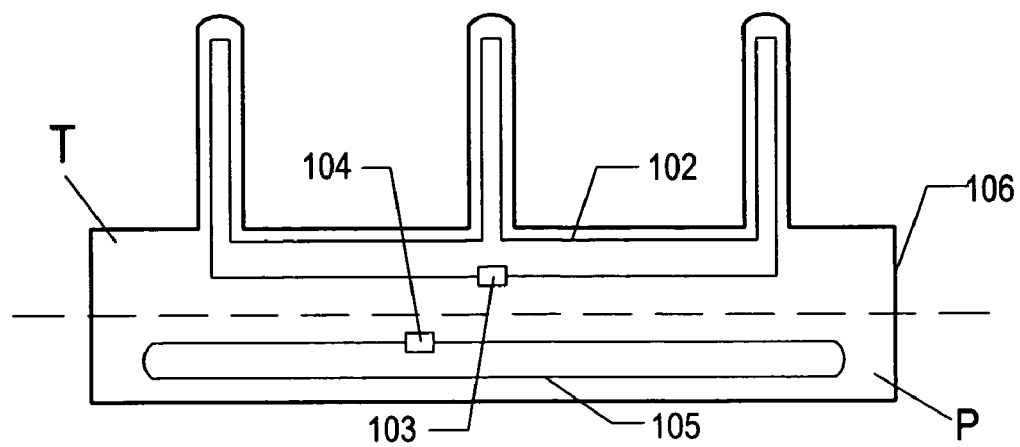
FIG. 1a is a view of the electronic component layout of an embodiment of the present invention depicting a single sheet comprising both a product label and the corresponding tamper label.
FIG. 1b is a view of the mechanical component lay of the embodiment.
FIG. 1c is a depiction of a RFID label embodiment as it may appear to a customer.
Figure 1:
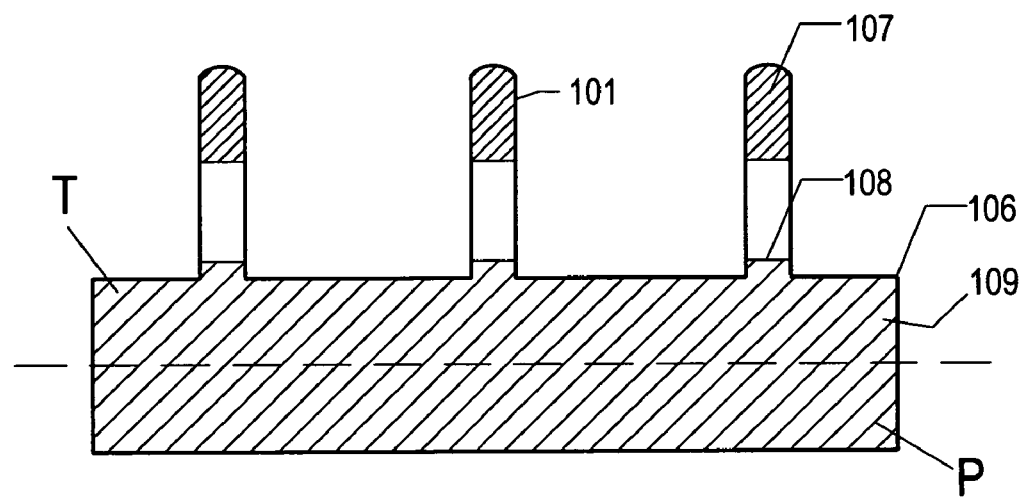
Figure 1:
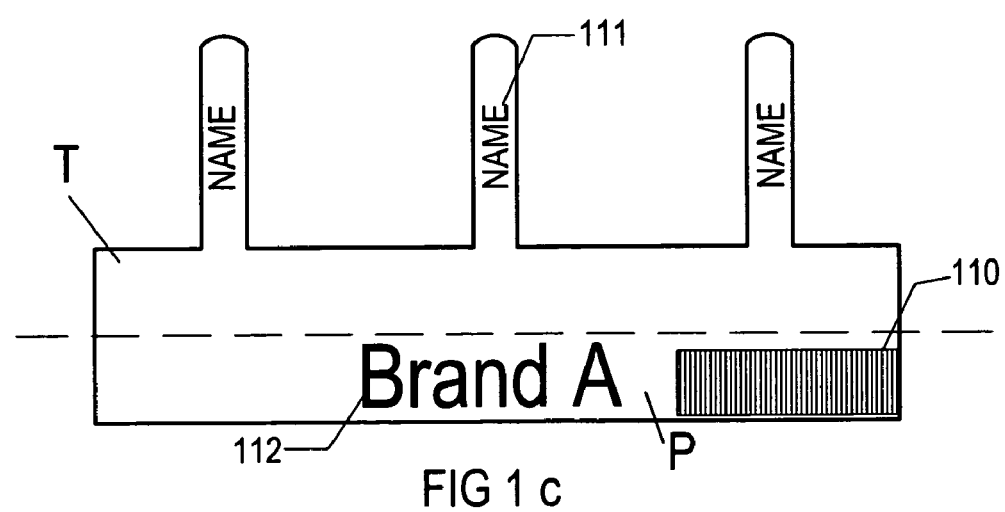

FIGS. 1a, 1b and 1c show various views of an illustrative embodiment of the present invention utilizing multiple RFID components 103 and 104 and their respective destructible conducting paths 102 and 105 on a single sheet 106. The sheet 106 is theoretically partitioned into a tamper portion or TRFIDL T and a product portion or PRFIDL P. The terms "portion" and "label" may be used interchangeably. FIGS. 1a, 1b and 1c are merely exemplary and non-limiting. The actual size and shape of the sheet 106 as well as whether the portions of sheet 106 are physically divided into separate labels is determined by the physical dimensions of the object or package that the PRFIDL P or TRFIDL T is to be permanently attached and the designer's preference. The sheet may contain any number of RFID components and be divided into a similar number of portions as required by the desired end use.

FIG. 1a is an illustrative embodiment wherein a sheet 106 contains two RFID components 103 and 104 and their associated destructible conducting paths 102 and 105. This example demonstrates an embodiment utilizing only two RFID components for clarity, a single tamper RFID component 103 and a product RFID component 104. Each RFID component 103 and 104 is electrically attached to its own destructible conducting path 102 and 105. It is well known in the art that a destructible conducting path may be constructed from a number of materials. A non-limiting list of examples may include metallic ink, metallic glue, deposited metal, dielectric material, etc. and may be manifested as a simple conducting path, an induction loop or a variety of resistive, inductive and capacitive circuits (not shown). An RFID component may be any number of RFID chips currently on the market or that will be in the future as would be known to one skilled in the art. As a non-limiting set of examples, such chips may be transponders, memory chips, EPROMs, PROMs or µ-chips ("MU" chips). The product RFID component 104 contains a unique data string that is associated with a data string on the tamper RFID component 103. The utilization of the data strings will be further discussed in a later section, infra. Each RFID component 103 and 104 is irremovably affixed to its portion of the sheet, T and P respectively, by means as is commonly known in the art. In turn, each of the TRFIDL T and the PRFIDL P are irremovably adhered to a product or product container.

As long as each RFID component 103 and 104 and its respective destructible conductive path 102 and 105 remains intact, exposure to radio frequency energy will cause each of the RFID components 103 and 104 to transmit its encryption that can be received and processed by at least one RFID scanner (not shown). There are a number of RFID scanners on the market that may be adapted for use with the present invention. The receipt of both associated encryptions will indicate that the product exists on the shelf and that it's TRFIDL T has not been tampered with. Should the tamper RFID component 103 or its destructible conducting path 102 be disabled, only the encryption received may be from the product RFID component 104. Such a condition would indicate that a product exists on the shelf with a broken TRFIDL T and needs to be removed as being potentially compromised. Should the product RFID component 104 or its destructible conducting path 105 be disabled, the only encryption received may be from the tamper RFID component 104. Such a condition would indicate that a product exists on the shelf with a broken or missing product label P and needs to be removed as being potentially compromised.

FIG. 1b is an exemplary mechanical view of the sheet 106 indicating that the product label portion P may have a product label adhesive 109 applied to one side of the product label portion P. The product label adhesive 109 fixedly attaches the product label portion P to the surface of a product package (not shown). The tamper label portion T may have product label adhesive 109 applied to a section of the tamper label or a different label adhesive as determined by the user for a given use. It is preferable that an irremovable tamper label adhesive 107 be applied to at least a section of the tamper strip portion (s) 101 whereby the tamper strip portion(s) 101 is irremovably adhered to the surface of the product package to which it is attached so that there is no ability to manipulate the surface without tearing or otherwise disrupting the tamper strip portion 101. Tearing the tamper strip portion 101 breaks the destructible conducting path embedded therein 102 and renders it an open circuit. The disruption of the destructible conducting path 102 is preferably facilitated by a perforation 108 or other mechanism weakening the juncture of the tamper strip(s) 101 to the main section of tamper portion T. FIG. 1c illustrates the non-adhesive side of the sheet 106 whereon the user may apply his product logo 112, information, bar codes 110 and any warnings that may be desired 111. The sheet is wrapped about and adhered to the circumference of the product package with the tamper portion T of the package closest to an access of the product package such that the tamper strip(s) 101 extend beyond the access of the package to be sealed. Each of the tamper strips 101 are then folded down across the package access such that the tamper adhesive 107 irremovably attaches to the surface of the product access (i.e. a box flap or a pill bottle cap) or to each other such that the access may not be manipulated without destroying the tamper strips 101 and the destructible conducting path 102 embedded therein.

Figure 2A:
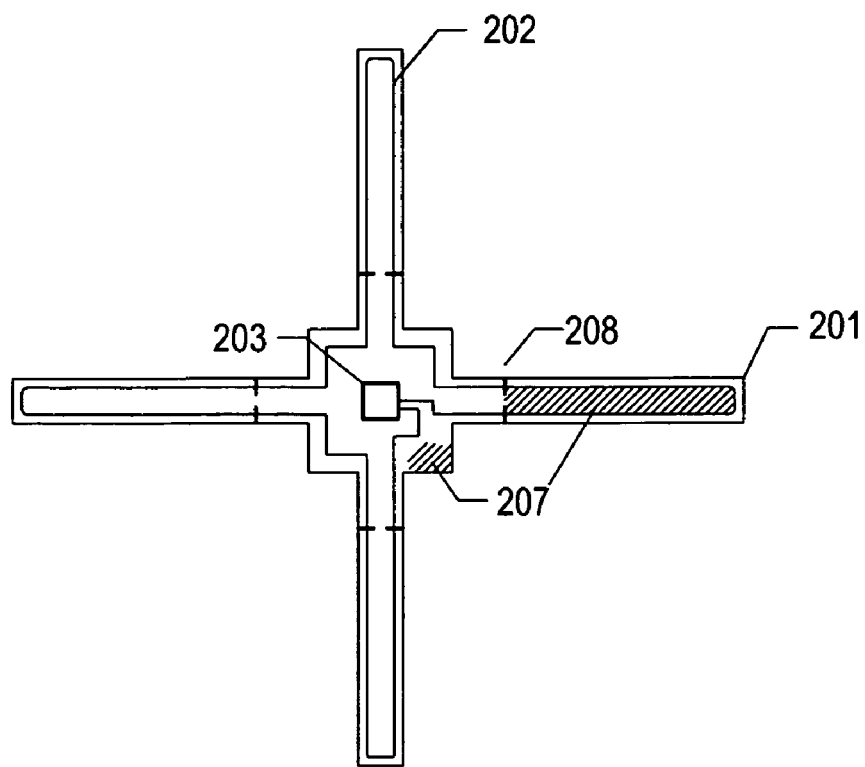
FIG. 2a is a layout of another embodiment of a tamper RFID label that may be used to seal a bottle.

FIG. 2a is another non-limiting, illustrative embodiment of another TRFIDL T. The TRFIDL T and its companion PRFIDL P (not shown) are separate although necessarily used together. The TRFIDL T and PRFIDL P with their embedded RFID components and destructible conducting paths are adhered to a product package separately. An RFID component 203 and its associated destructible conducting path 202 are embedded in the TRFIDL T. In this embodiment, TRFIDL T, may include four tamper strips 201 and the destructible conducting path 202 may be routed through all four tamper strips 201.

Figure 2B:
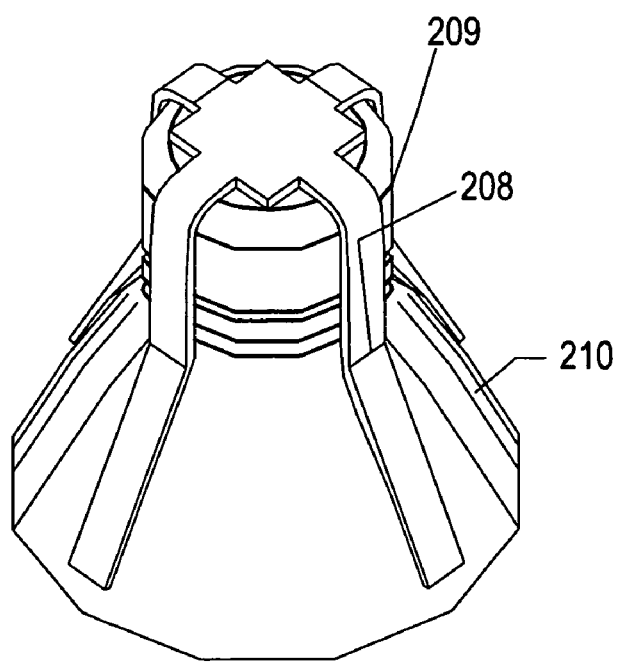
FIG. 2b is an exemplary view of the embodiment of tamper RFID label as applied to a bottle.

The TRFIDL T is coated with a tamper adhesive 207 at the distal end of each tamper strip 201 and in the center of the TRFIDL T. The TRFIDL T and the location of the tamper adhesive 207 may be of any size and shape and is tailored by the user in order to fit the subject product package. FIG. 2b illustrates an exemplary application of this non-limiting exemplary embodiment to a bottle. The bottle could be a pill bottle as used in a nursing home. The center of the TRFIDL is irremoveably and adhesively attached to the surface of the product package access 209 (i.e. the bottle top) by the tamper adhesive 207 and the distal ends of the tamper strips 201 are irremoveably and adhesively secured to the surface of the product package (i.e. the bottle) 210 by their tamper adhesive 207. With the TRFIDL T placed as shown in this embodiment, the bottle top 209 can not be removed or the product accessed through the bottle top without tearing or puncturing part of the TRFIDL T thus destroying the RFID component 203 or the destructible conducting path 202. The actual placement of the tamper RFID component and the routing of the destructible conducting path may be anywhere on the TRFIDL T and is determined by the user in such a way to ensure that the tamper RFID component or destructible conducting path is rendered inoperable when the product package is inappropriately manipulated. The tearing of the TRFIDL T and the destruction of the destructible conducting path 202 may be facilitated by incorporating a perforation 208 or otherwise weakening the junction of a temper strip to the remainder of the temper portion T.

Figure 3A:
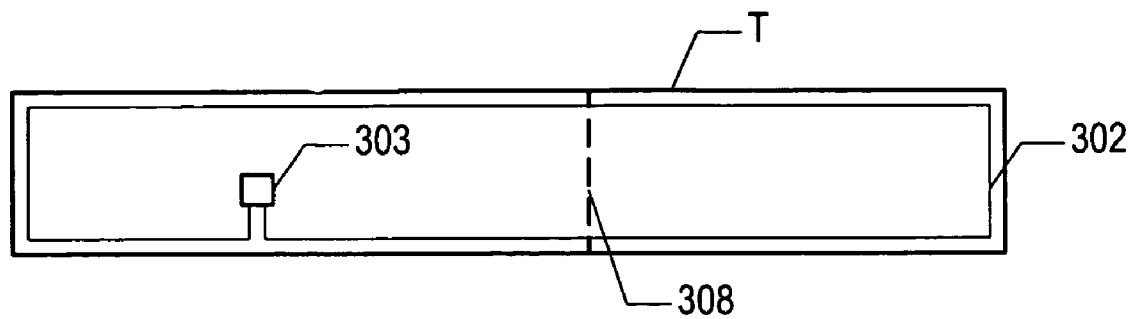
FIG. 3a is a plan view of another embodiment of a tamper RFID label that may be applied to a box end.
Figure 3B:
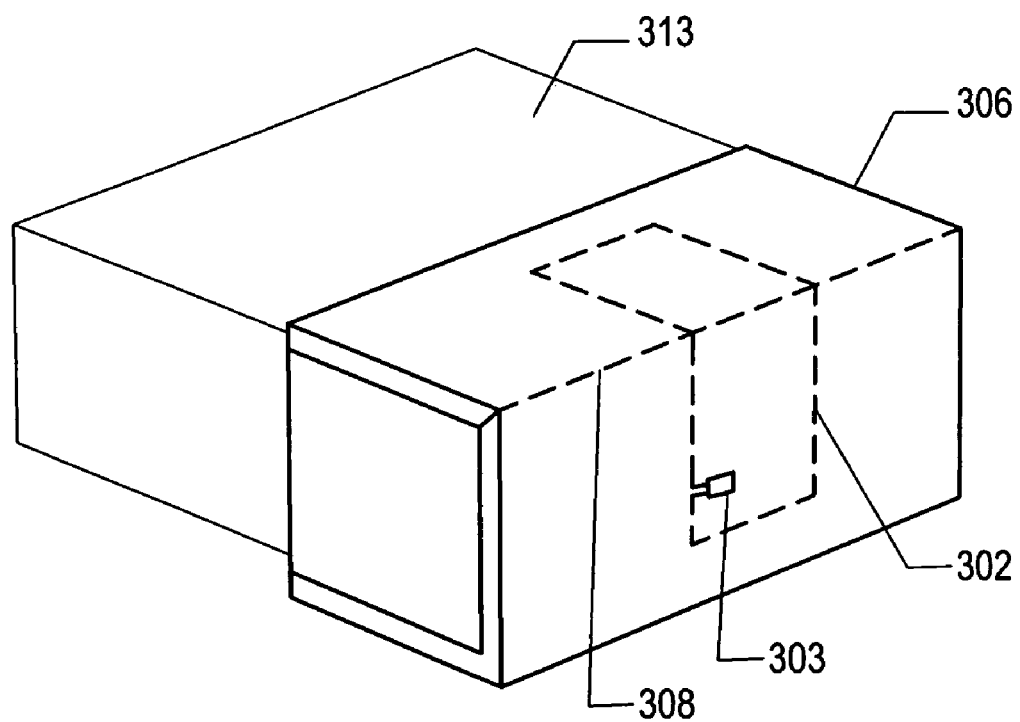
FIG. 3b is an exemplary view of an embodiment of a tamper RFID label as applied to a box end.

FIG. 3a is another preferred embodiment of a TRFIDL T. The TRFIDL T and its companion product portion P (not shown) with their embedded RFID components and destructible conducting paths are separate although necessarily used together. The illustrated embodiment may be used to tamper seal a box end such as is commonly know and in widespread usage. In this non-limiting example, TRFIDL T has one tamper RFID component 303. The tamper RFID component is electrically attached to a destructible conducting path 302 which is routed throughout the TRFIDL T. FIG. 3b depicts the TRFIDL T as it is applied to a package or box end. The drawing is of a non-limiting example. The actual size and shape of the TRFIDL T, the number and proportions of the TRFIDL(s) T and the routing of the destructible conducting path is determined by the user in order to accommodate the dimensions of the package to be sealed. As with the other embodiments, one side of the TRFIDL T is coated with an adhesive (not shown) such that it becomes irremovably attached to the box when placed across the box end 313 such that any manipulation or puncture of the TRFIDL T will cause the destruction of the tamper RFID component 303 or the destructible conducting path 302. The destruction of the conducting path 302. The destruction of the destructible conducting path 302 is facilitated by the use of a perforation 308 or other means of weakening the TRFIDL T at a predesignated location.

Figure 3C:
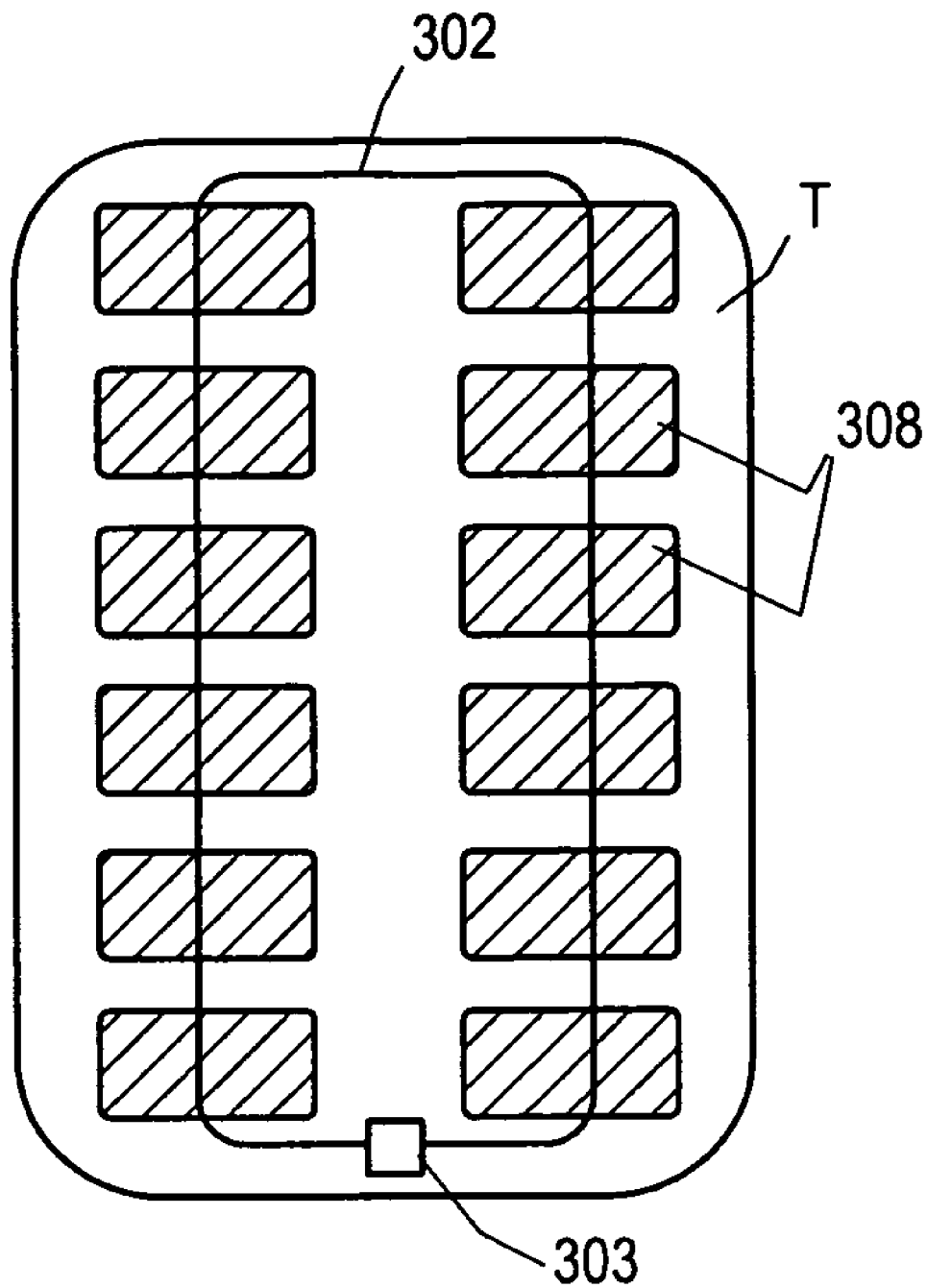
FIG. 3c is an exemplary view of an embodiment of a tamper RFID label as applied to a blister pack.

FIG. 3c depicts an exemplary TRFIDL T as it is applied to a blister pack that may commonly be used for packaging medicines. The drawing is of a non-limiting example. The actual size and shape of the TRFIDL T, the routing of the destructible conducting path is determined by the user in order to accommodate the dimensions of the package to be sealed and the layout of the product being contained. As with the other embodiments, one side of the TRFIDL T is coated with an adhesive (not shown) such that it becomes irremovably attached to the package when placed across the perforated press out areas 308 such that any removal or puncture of the TRFIDL T will cause the destruction of the tamper RFID component 303 or the destructible conducting path 302. The destruction of the destructible conducting path 302 is facilitated by the use of a perforation 308 or other means of weakening the TRFIDL T at a predesignated location(s).

Figure 4A:
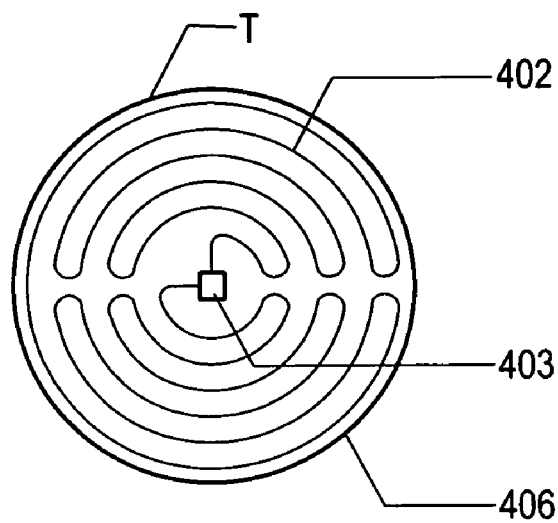
FIG. 4a is a plan view of another embodiment of a tamper RFID label as applied to a bottle opening.
Figure 4B:
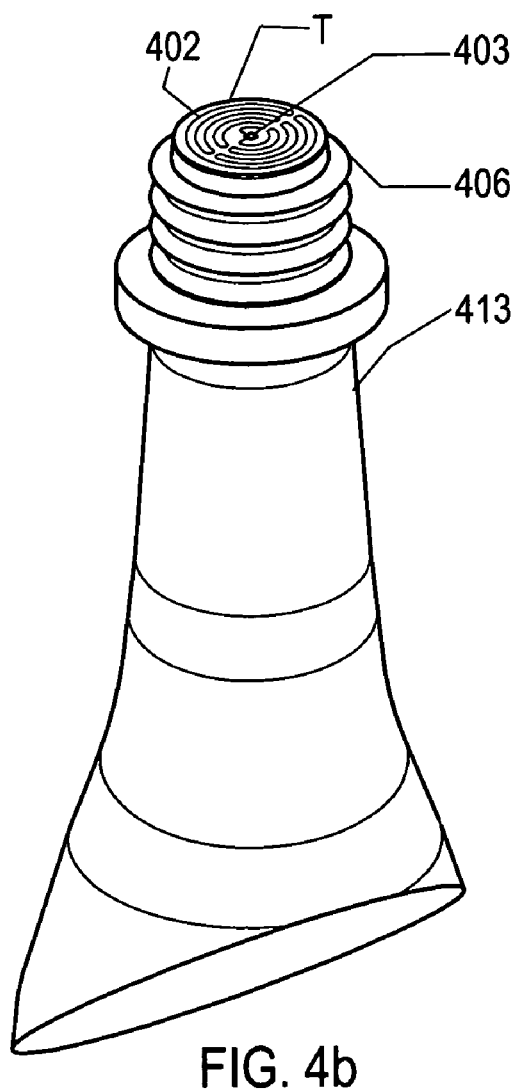
FIG. 4b is an exemplary view of an embodiment of a tamper RFID label as applied to a seal on a bottle opening.

FIG. 4a illustrates another preferred embodiment of the invention. As in all the other embodiments, the TRFIDL T is necessarily used in conjunction with a product portion P (not shown). This preferred embodiment may be applied to seal a container opening. As a non-limiting example, such a container may be a bottle such as ketchup bottle or a bottle of motor oil 413. The opening may be of any shape. The TRFIDL T may be used under and in addition to a bottle cap or a twist top. In this exemplary embodiment, the entire TRFIDL T with the exception of the immediate area containing the tamper RFID component 403 may be a tamper strip 406. The TRFIDL T contains a tamper RFID component 403 and a destructible conducting path 402. The shape and routing of the destructible conducting path may be of any configuration as desired by the user to conform to the dimensions of the product package and the product. FIG. 4b illustrates the TRFIDL T when fixed to an opening. The TRFIDL T may be irremovably attached to the opening to be sealed by a tamper adhesive (not shown) as is known in the art of packaging or it may also be irremovably attached by crimping or other means as is well known in the art of product packaging.

Figure 5C:
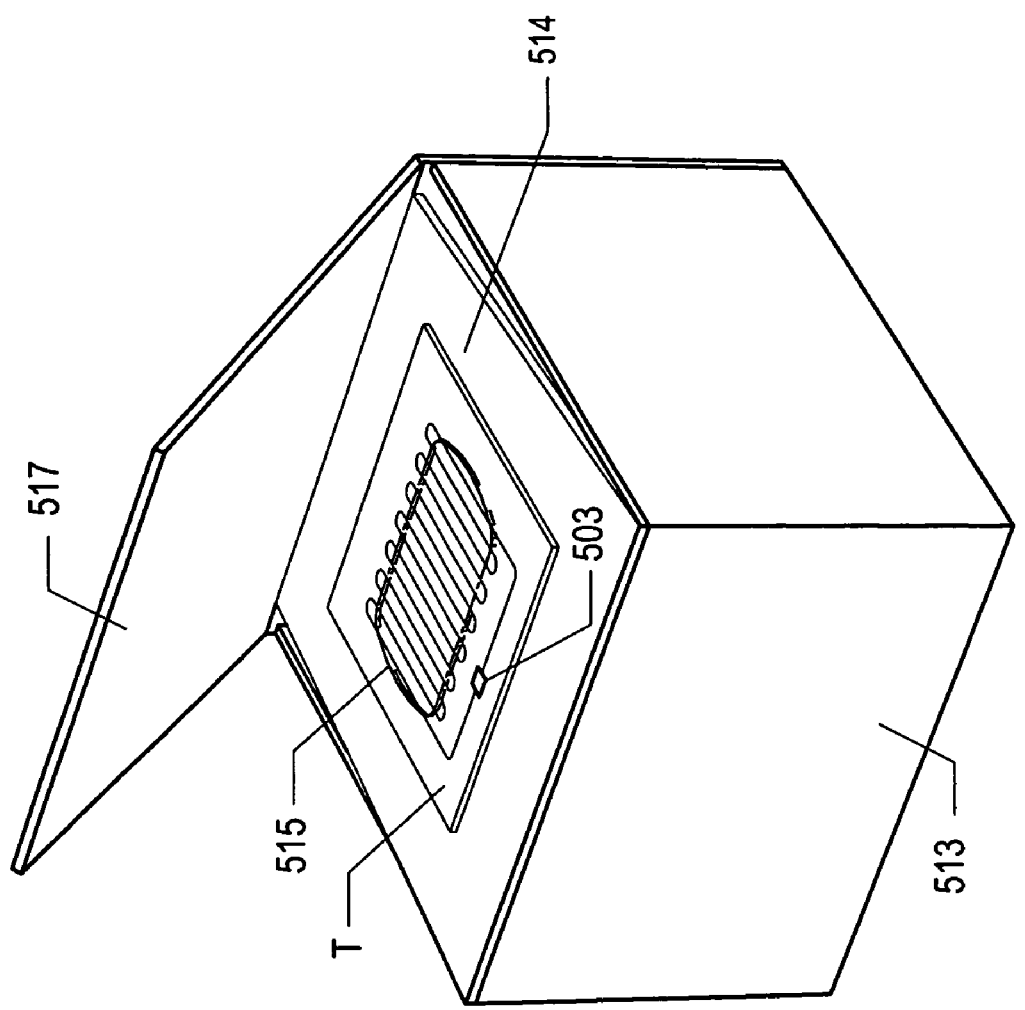
FIG. 5c is an exemplary view of an embodiment of a tamper RFID label as may be applied to box flaps.

FIGS. 5a, 5b and 5c illustrate yet another preferred embodiment of the invention. As in all the other embodiments, the TRFIDL T is necessarily used in conjunction with a product portion P (not shown). This preferred embodiment may be applied to seal the flaps of a box end. As a non-limiting example, such a container may be a small box such as pharmaceutical box 513. The opening may be of any shape. The TRFIDL T may be used between an inner flap 514 and an outer flap 517. The TRFIDL T contains a tamper RFID component 503 and a destructible conducting path 502. In this embodiment the entire TRFIDL T with the exception of the immediate area containing the tamper RFID component 503 may be a tamper strip. The shape and routing of the destructible conducting path may be of any configuration as desired by the user to conform to the dimensions of the product package and the product. FIG. 5b illustrates the TRFIDL T when fixed to an opening. The TRFIDL T may be irremovably adhered to the top side of the inner flap 514 by a tamper adhesive 507, when closed, and it may also be irremovably adhered to the underside of the outer flap 517, when closed, by an adhesive tear off layer 515. The TRFID label T is thus irremovably sandwiched between the inner and outer flap and will be disabled when the box end is opened and adhesive tear off layer 515 tears the destructible conducting path 502. The tearing of the destructible conducting path 502 may be assisted by designing the TRFIDL T with pre-weakened areas as is known in the art.

Figure 6A:
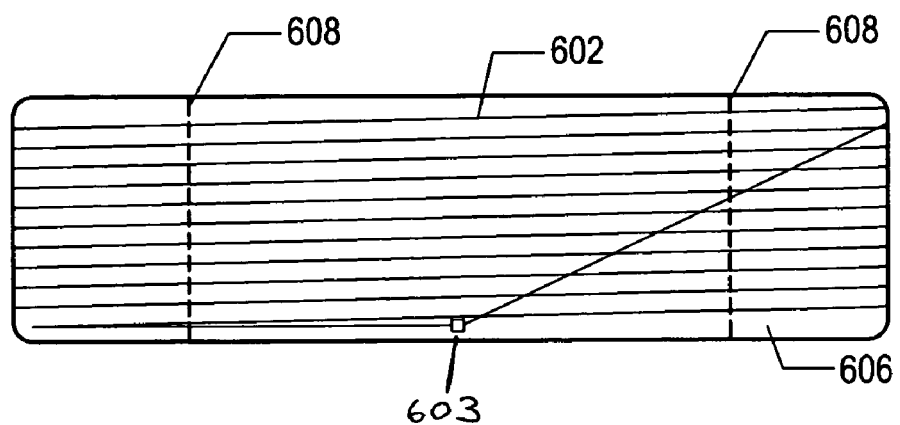
FIG. 6a is a side view of another embodiment of a tamper RFID label as may be applied to a bottle screw top.
Figure 6B:
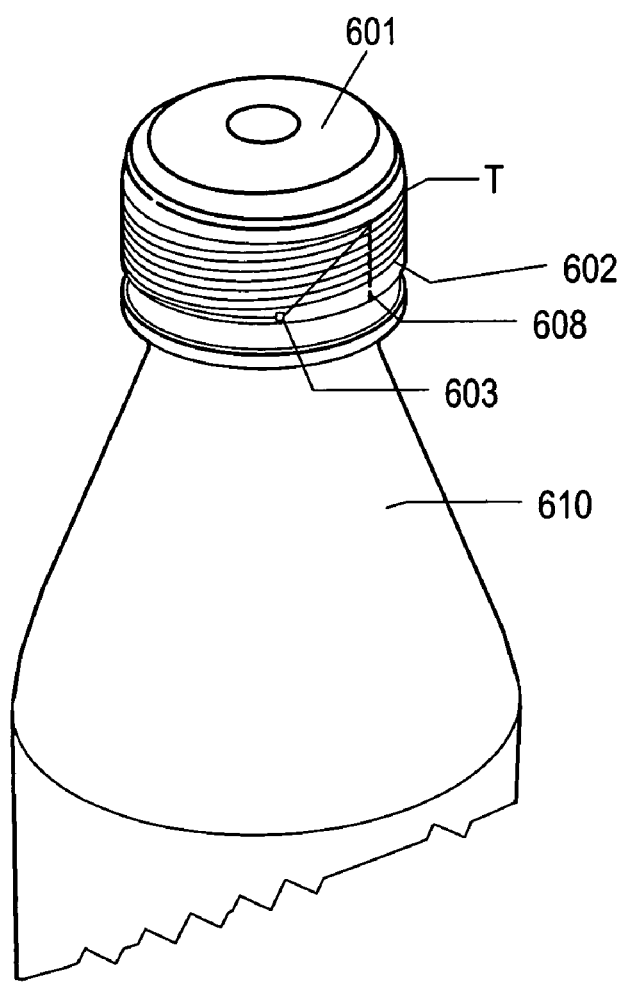
FIG. 6b is a perspective view of the tamper seal as may be applied to a bottle screw top.

FIGS. 6a and 6b illustrate yet another preferred embodiment of the invention. As in all the other embodiments, the TRFIDL T is necessarily used in conjunction with a PRFIDL P (not shown). This exemplary embodiment may be applied to seal a twist off cap to a bottle 610. As a non-limiting example, such a container may be a soda pop bottle. The TRFIDL T may be comprised of a plastic substrate such as shrinikwrap which is situated around the neck and cap of the bottle. The tamper RFID chip 603 is embedded on the inside of the substrate 606 is electrically connected to a destructible conducting path 602 which winds around the inside of the substrate 606 as shown. The tamper RFID chip may be located anywhere along the route of the destructible conducting path. As the bottle cap 601 is manipulated for removal, the substrate 606 may tear, destroying the destructible conducting path and thereby preventing the tamper RFID chip from transmitting. The nature of the substrate is not critical to the present invention and any material may be used as determined by one skilled in the art to fit the bottle and accept the embedding of tamper RFID chip 603 and its destructible conducting path 602. To facilitate the destruction of the RFID components, it is preferred that the substrate 606 include one or more perforations 608 and that the substrate be adhered to the cap 601 and the bottle 610.

Figure 7:
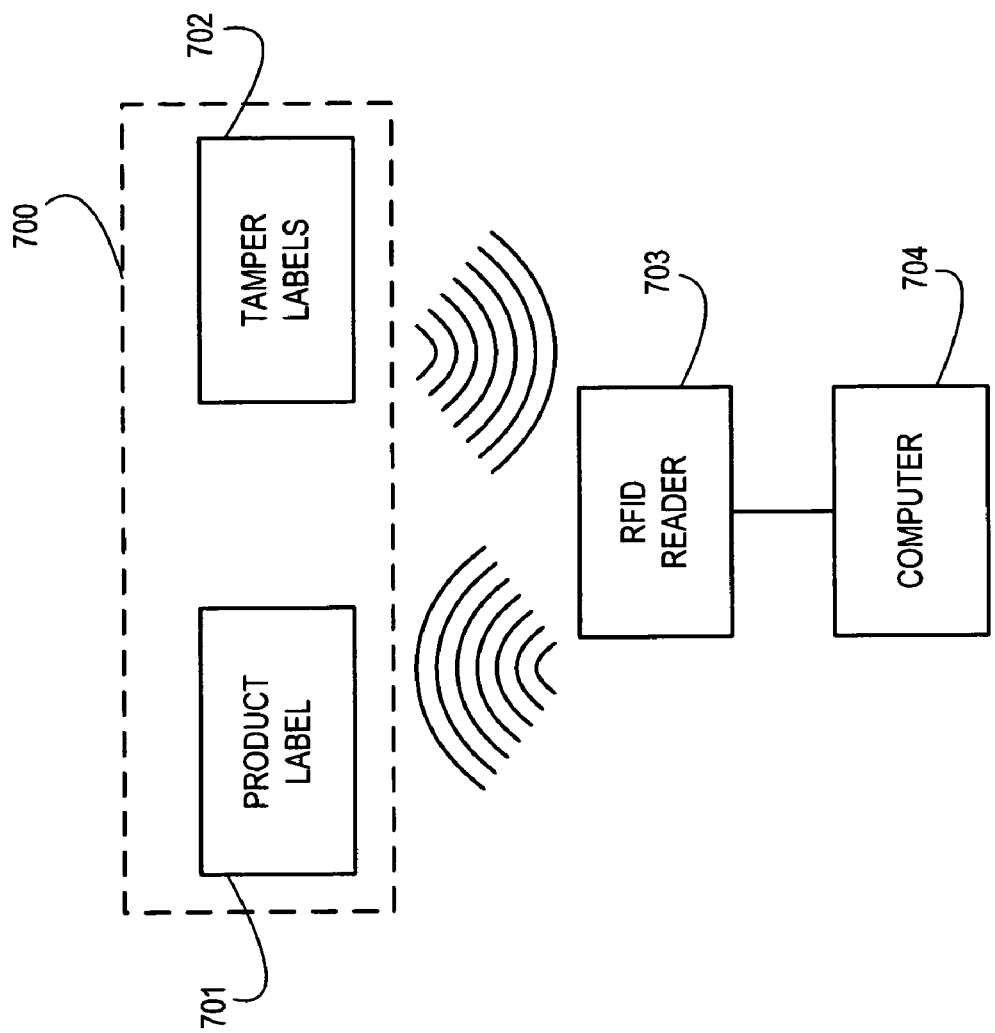
FIG. 7 is an exemplary block diagram of the basic operation of the invention.

As previously discussed, supra, the preferred embodiments of the present invention each utilize a PRFIDL 701 plus one or more TRFIDLs 702 as illustrated in FIG. 7. The PRFIDL 701 acts in the role of product identification and the TRFIDLs 702 seal the accesses in a product's packaging to prevent or identify tampering. In operation, a plurality of product packages are scanned simultaneously by radiating radio frequency energy at them using a RFID reader 703. Such readers may be hand held and scan a single package at a time and others may be capable of scanning entire pallets, shelves or rooms of product. One may use multiple readers if desired and may use scanners with multiple antennas. Off the shelf RFID scanner/readers may be adapted for use by the present invention, the techniques for which are well known in the industry. It must be noted that although most of the RFID technology discussed herein concerns passive RFID components that do not require an internal energy source, RFID components utilizing a battery or other internal power source may also be integrated into the present invention utilizing the same principals disclosed herein. It should be further noted that to the extent that an RFID component and a destructible conducting path are compatible with a particular packaging material and manufacturing process, the RFID component and the destructible conducting path may be embedded directly into the packaging material itself.

As discussed above, each PRFIDL 701 and TRFIDL(s) 702 attached to a given product package 700 contains an embedded RFID component upon which an unique encryption may be recorded that may read by a RFID reader 703 as long as the RFID component, including any corresponding destructible conducting path, is physically intact and operable. Each encryption on a particular product should preferably be truly unique relative to the product stock in the user's supply chain. However, it is entirely conceivable that the encryptions could be reused after an elapsed time wherein the user is certain that the previous product package utilizing the encryption no longer exists in the supply chain. The creation of the encryptions is completely at the discretion of the system user.

Although the encryptions on the PRFIDL 701 and each TRFIDL 702 may be unique from each other and from the rest of the encryptions on product packages in the area, they should preferably be logically associated with each other. As a non-limiting example, employing a PRFIDL 701 and a single TRFIDL 702 for clarity of demonstration, the PRFIDL 701 may have a recorded encryption that comprises the product's Uniform Product Code (UPC), a serial number (S/N) such as:

| Encryption | UPC | S/N |
|---|---|---|
| 8522762903 345 = | 8522762903 + | 345 |

In this example, the number 8522762903 is the UPC and 345 is the serial number.

The encryption on the package's corresponding TRFIDL 702 may be associated by reusing the UPC and serial number and then adding a third number which is a tamper label code such as 2302. The resulting TRFIDL 702 encryption may then be:

| Encryption | UPC | S/N | Tamper code | TPL# |
|---|---|---|---|---|
| 8522762903 345 2302 1 = | 8522762903 | 345 | 2302 | 1 |

It should be noted that the encryptions may be any combination of letters, numbers or symbols that may be read by the RFID reader 703 and interpreted by the RFID reader's software executing on a computer 704. In the case where there are multiple TRFIDLs attached to a single product package, their encryptions could all be made unique and associated by assigning additional Tamper codes such as 2303, 2304 . . . for instance. Adding a specific identification of each of the multiple TRFIDL applied to a package may also be included (i.e. TPL#). Another possible example of creating unique encryptions is to add code for the date and time of the TRFID label's printing. As one of ordinary skill in the art would recognize, The combinations and permutations available to produce unique and associated encryptions are multitudinous and at the discretion and taste of the system designer.

In use, the RFID Scanner/Reader(s) 703 radiates throughout an area containing a multitude of products and product packages. Each RFID component embedded on each PRFIDL and TRFIDL in the radiated area in turn is energized to broadcast its encryption. If a PRFIDL or a TRFIDL has been tampered with or otherwise damaged such that the embedded RFID component or its associated destructible conducting path is no longer operable, that unique encryption will not be broadcast with its associated encryptions from the other label(s). The RFID Reader 703 will pickup all of the transmitted encryptions for the various product packages which will, in turn, be processed by the RFID software executing on the RFID Reader's computer 704. The use of multiple scanner readers may reduce reception errors and allow for location by triangulation or by zone tracking as the product moves from place to place within a facility.

Figure 8A:
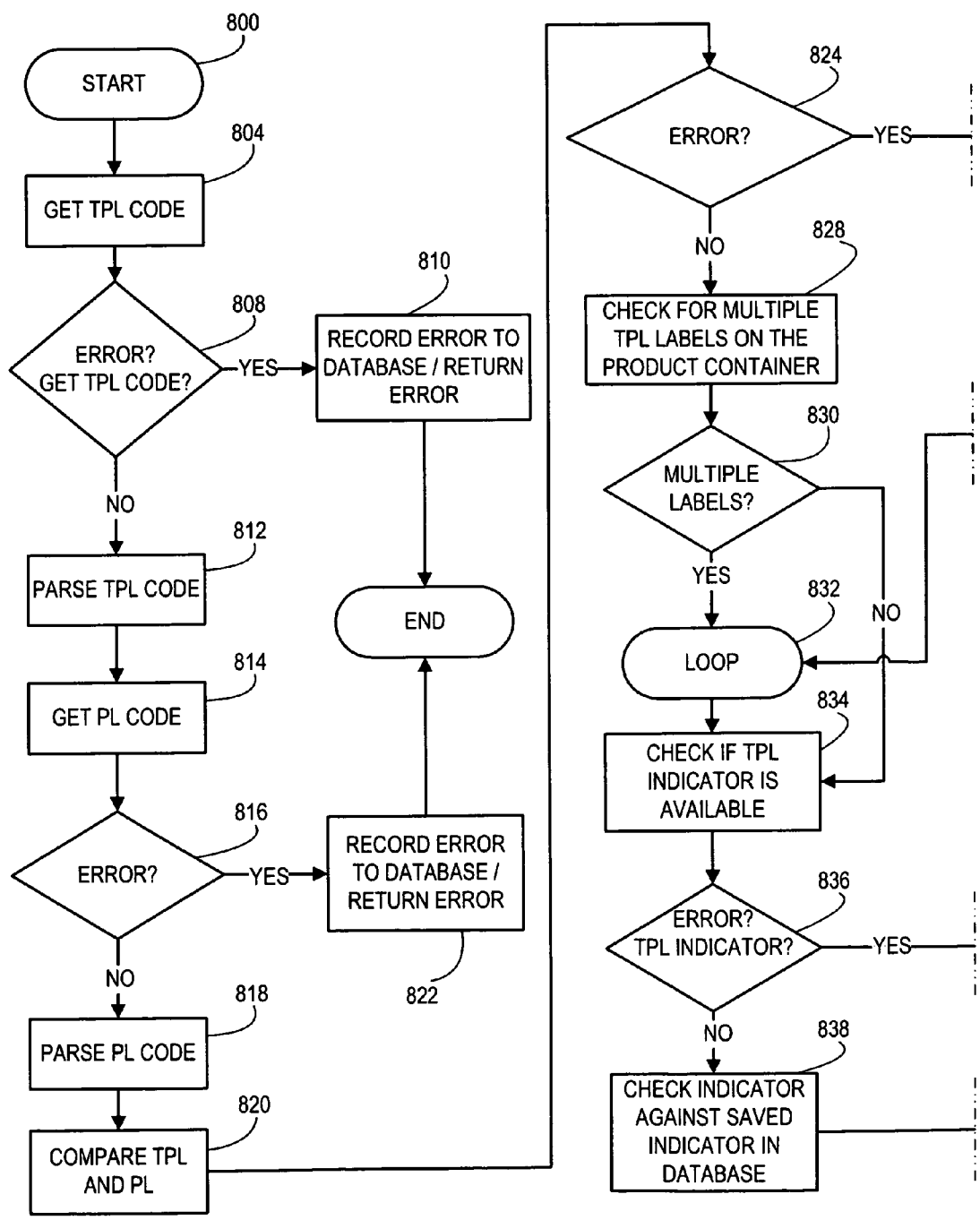
FIG. 8 is an exemplary basic flowchart of the invention logic progression.
Figure 8B:
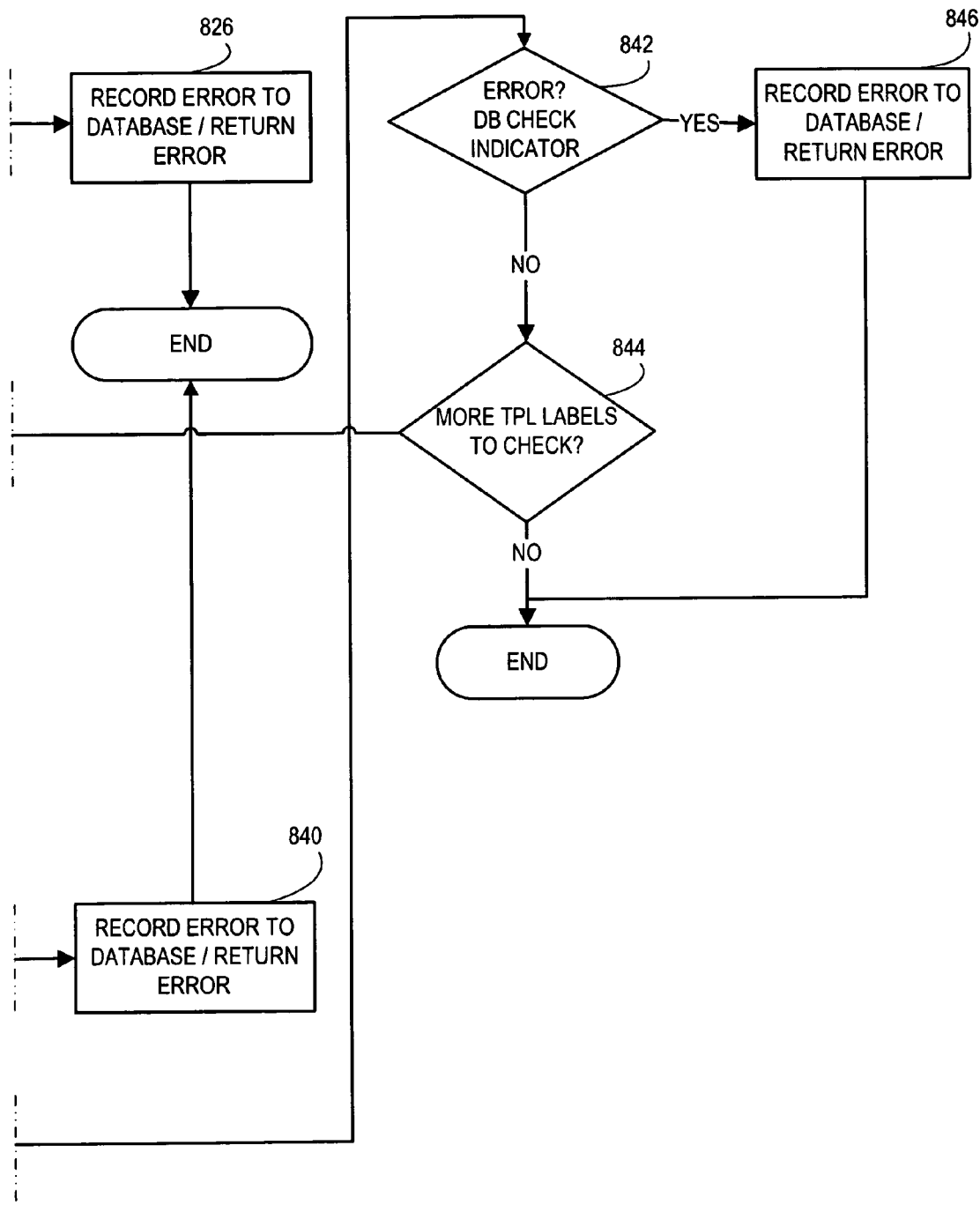

FIG. 8 presents a non-limiting, exemplary logic flow of the RFID Scanner/Reader software executing on computer 704, the software being stored on a computer readable medium to be executed on a computer processor. It would be obvious to one skilled in the art that variations to the exemplary logic diagram could be made without parting from the scope and spirit of the invention and are contemplated herein. In this exemplary flow diagram, the process begins at steps 800 where the RFID Reader 703 queries the product 700. The transmitted data string from the TRFIDL 702 (the "TPL Code") may be read into computer 704 at step 804. Since the TRFIDL(s) 702 and PRFIDL 701 are queried simultaneously, the order in which they are processed is not of consequence. In step 808, the TPL may be checked for validity or corruption. If the received TPL is corrupted, it may be logged and an error message or an alert is returned. That alert may be in the form of a prerecorded announcement file to one or more central offices of a communications network. If the TPL is valid, it may be parsed for further processing in step 812. The same procedure may be repeated for the data string received from the PRFIDL 701 (the "PL Code") whereby the PL Code may be read into the computer 704 at step 814 and checked for error in step 816. Invalid PL Codes and TPL Codes may be logged and an error message may be returned in steps 822 and 810, respectively. The PL Code may be parsed for further processing in step 818.

It should be reiterated that in practice a plurality of items may be scanned at one time. As such a plurality of TPL Codes and PL Codes may be received essentially simultaneously. As such, a data array, database or other data schema may be employed to store the TPL Codes and the PL Codes prior to being scanned for error and processed further. For example the TPL Codes could be stored in a first data base and the PL Codes in a second database and the two databases then compared. Any number of parallel or mass data processing techniques known in the art of data processing may be used. An exclusive teaching of serial processing of the TPL and PL Codes should not implied by way of this exemplary flow diagram. As another non-limiting example, processing may be done in parallel and different databases could be compared against each other.

In step 820, the received TPL and PL codes may be compared among themselves for matching data strings or for matching segments of the data string which may indicate that one or more TPLs and the PL are from the same product item 700. The comparison process may comprise a simple looping algorithm or may comprise a more sophisticated logic process as would occur to one skilled in the art. In the present non-limiting example, the parsed data strings maybe checked for error in step 824. It would be desirable to confirm that the parsing and comparison processes in steps 812, 818 and 820 did not result in creating errors to the parsed TPL and PL codes prior to further processing. The use of error check points is a routine step in most computer programs and may be conducted at any point in the process as desired by the user. Any errors found in step 824 may be recorded to an error database and an alert may be generated 826. An alert generated in step 824 may be indicative of a missing TPL Code and PL Code caused by a missing or a tampered TRFIDL T or a PRFIDL P that my require that the associated product item 700 be removed from offer.

In step 828 a data base resident and executing as a part of RFID Scanner/Reader software executing on computer 704, may be consulted to determine how many TRFIDLs T are expected to be attached to each product item 700. If multiple TRFIDLs T are expected 830 on each product item 700, then the plurality of received TPL Codes searched until a related TPC Code for that particular item 700 may be identified in step 832. When a TPL Code corresponding to the product item 700 has been identified or if only one TPL Code is expected, the TPL Codes may be inventoried 834 by looking for a characteristic TPL# within the data string that identifies each individual TRFIDL T. As indicated above, the TPL# may be as simple as a sequential integer assigned to each TRFIDL T attached to the product item 700 and appended to the TRFIDLs T data string. If multiple TPL Codes are expected and the computer 704 does not have the expected TPL#836 with which to inventory the TRFIDLs T, an error may generated and reported in step 840. In step 838 the TPL#may be read and inventoried against the expected number in the data base resident and executing as a part of RFID Scanner/Reader software executing on computer 704. If less than all of the expected TRFIDLs are accounted in step 838, an error may be generated in step 842 and an alarm may be generated 846. An alarm generated at step 846 may be not indicative of a data processing or a data read error. An alarm at this point may be indicative of a missing or non-functioning TRFIDL T and may be the result of tampering or a manufacturing error requiring that the associated product item 700 be removed from offer. At step 844, process for a given product item 700 may be terminated when all of the TPL codes and the PL codes have been identified and inventoried.

What has been described is merely illustrative of the present invention in a variety of exemplary embodiments. Other applications of a TRFIDL T and a PRFIDL P as well as other component logic subroutines are contemplated as being within the knowledge of one skilled in the art and may be utilized without departing from the spirit and scope of the present invention.

What is claimed is:

1. A system to detect product tampering comprising:
    one or more labels;
    two or more electronic components, wherein at least two of the two or more electronic components are fixedly attached to each of the one or more labels;
    an electronically readable data string recorded on each of the two or more electronic components, each data string being distinctive but associated with each other;
    at least one destructible conducting path electrically attached to each of the two or more electronic components and fixedly attached to the a substrate of its respective electronic component, whereby the destructible conducting path is disrupted when the substrate is tampered, thereby modifying the function of the electronic components;
    means for permanently attaching the one or more labels to at least one surface, wherein an attempt to manipulate the at least one surface shall disrupt the destructible electrically conducting path;
    means for remotely reading the electronically readable data string resident on each of the two or more electronic components;
    means for sorting the electronically readable data strings read from each of the two or more electronic components after reading the electronically readable data strings, the means for sorting including a computer-readable medium storing a plurality of instructions adapted to be executed by a processor, the plurality of instructions to:
        determine an actual number of associated electronically readable data strings by distinguishing differences between the associated electronically readable data strings,
        compare the actual number of associated electronically readable data strings to an expected number of associated electronically readable data strings, the expected number of associated electronically readable data strings being determined from parsing the associated electronically readable data strings;
        determine that an associated electronically readable data string failed to be detected by the means for remotely reading; and
        if an electronically readable data string failed to be detected, generate an error.

2. The system of claim 1, wherein the two or more electronic components are RFID components.

3. The system of claim 2, wherein at least one of the two or more RFID components is energized by a power source.

4. The system of claim 1 wherein, the at least one surface is chosen from a group consisting of cardboard, paper, plastic, metal, wood, leather, rubber, glass, shrink-wrap, a beverage can opening tab, a cork, a wax seal, a paraffin seal.

5. The system of claim 1 wherein the at least one destructible conducting path is selected from a group comprising an antenna, an induction loop and an electronic circuit.

6. The system of claim 1 wherein the means for electronically reading the electronically readable data string on each of the two or more electronic components includes:
    a plurality of dispersed antennas in communication with the means for sorting the electronically readable data string; and,
    the computer-readable medium storing an additional plurality of instructions adapted to be executed by the processor for providing error alerts, the additional plurality of instructions comprising:
        receiving the electronically readable data strings;
        associating the electronically readable data strings with one or more objects; and
        determining the location of the one or more objects.

7. The system of claim 1 wherein the means for remotely reading the electronically readable data string on each of the two or more electronic components includes:
    a plurality of dispersed RFID scanners in communication with the means for electronically reading the electronically readable data strings, each of the plurality of disbursed RFID scanners being geographically located such that an effective coverage area resulting from dispersing the plurality of disbursed RFID Scanners encompasses at least a desired coverage area.

8. A tamper prevention device comprising:
    at least one multilayered sheet comprising;
        a product label portion; and
        one or more tamper strip portions, wherein the product label portion and the one of more tamper strip portions include each layer of the multilayered sheet;
    at least two RFID components, wherein a first of the at least two RFID component is fixedly attached to only the product label portion and an additional RFID component of the at least two RFID components is fixedly attached only to one or more tamper strip portions;
    an electronically readable data string recorded in each of the at least two RFID components wherein the electronically readable data strings are associated with each other and each electronically readable data string contains information whereby an expected number of the associated electronically readable data strings is determined by parsing the associated electronically readable data strings;
    at least one destructible conducting path electrically attached to each of the at least two RFID components and fixedly attached only to the portion of the multilayered sheet of its respective RFID component, wherein the at least one destructible conducting path is at least partially routed through the at least one tamper strip portion; and
    a means for permanently attaching the at least one sheet to at least one surface, wherein an attempt to manipulate the at least one surface disrupts the at least one destructible electrically conducting path fixedly attached to the respective one or more tamper strip portions.

9. The device of claim 8 wherein the at least one of the at least two RFID components is an RFID transponder.

10. The device of claim 8 wherein the device is energized by a power source.

11. The device of claim 8 wherein the tamper strip portion further comprises a perforation, the perforation facilitating the destruction of the conducting path.

12. The device of claim 8 further comprising a means for electronically reading and sorting the electronically readable data strings including a computer-readable medium storing a plurality of instructions adapted to be executed by a processor for providing error alerts, the plurality of instructions comprising:

receiving the electronically readable data strings from a plurality of RFID scanners;
   sorting the electronically readable data strings;
   associating the electronically readable data strings with the at least one surface; and,
   determining a geographic location of the at least one surface.

13. A method to detect product tampering comprising:

permanently affixing a first RFID label to a surface of a product package, wherein the first RFID label integrally comprises a first electronically readable data string recorded on a first RFID component connected to a first destructible conducting path;
   permanently affixing one or more additional RFID labels to one or more accesses in the product package, wherein manipulating the one or more accesses shall disrupt one of an additional RFID component and an additional destructible conducting path electrically connected to the additional RFID component each of which are integrally attached to the one or more additional RFID labels, wherein further the additional RFID component contains an additional electronically readable data string that is associated with the first electronically readable data string;
   reading the first electronically readable data string and the additional electronically readable data strings;
   storing the first electronically readable data string and the additional electronically readable data strings;
   after reading the first electronically readable data string and the additional electronically readable data strings inventorying the additional electronically readable data strings, the inventorying comprising:
      determining an actual number of distinct additional electronically readable data strings associated with the first electronically readable data string by distinguishing differences between the additional electronically readable data strings associated with the first electronically readable data string, and
      comparing the actual number of distinct additional electronically readable data strings to an expected number of distinct additional electronically readable data strings, the expected number of distinct additional electronically readable data strings being determined by parsing at least one of the additional electronically readable data string and the first electronically readable data string;
   determining that a distinct additional electronically readable data string associated with first electronically readable data string failed to be detected in the reading step; and
   generating an error, the error including the undetected additional electronically readable data string.

14. The method of claim 13, wherein the first RFID component and the first destructible conductive path and the one or more additional RFID components and the additional destructible conductive paths are permanently embedded in the surface of the product package.

15. The method of claim 13, wherein one of the first a RFID component and the additional RFID components comprises a µ-chip (MU-chip).

16. The method of claim 13 wherein determining a number of distinct additional electronically readable data strings comprises comparing a first database with a second database, wherein the existence of the first electronically readable data string in the first database without detecting the associated additional electronically readable data strings in the second database generates an error.

17. The method of claim 13 wherein reading the first electronically readable data string and the additional electronically readable data strings comprises;

reading a single first electronically readable data string; and
   comparing the single first electronically readable data string to each additional electronically readable data string until all associated additional electronically readable data strings are accounted for.

\* \* \* \* \*